Figure 4:
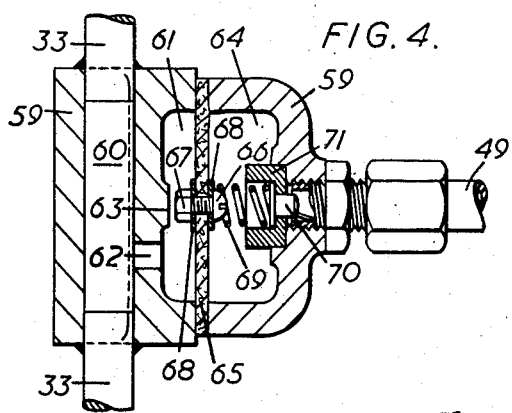

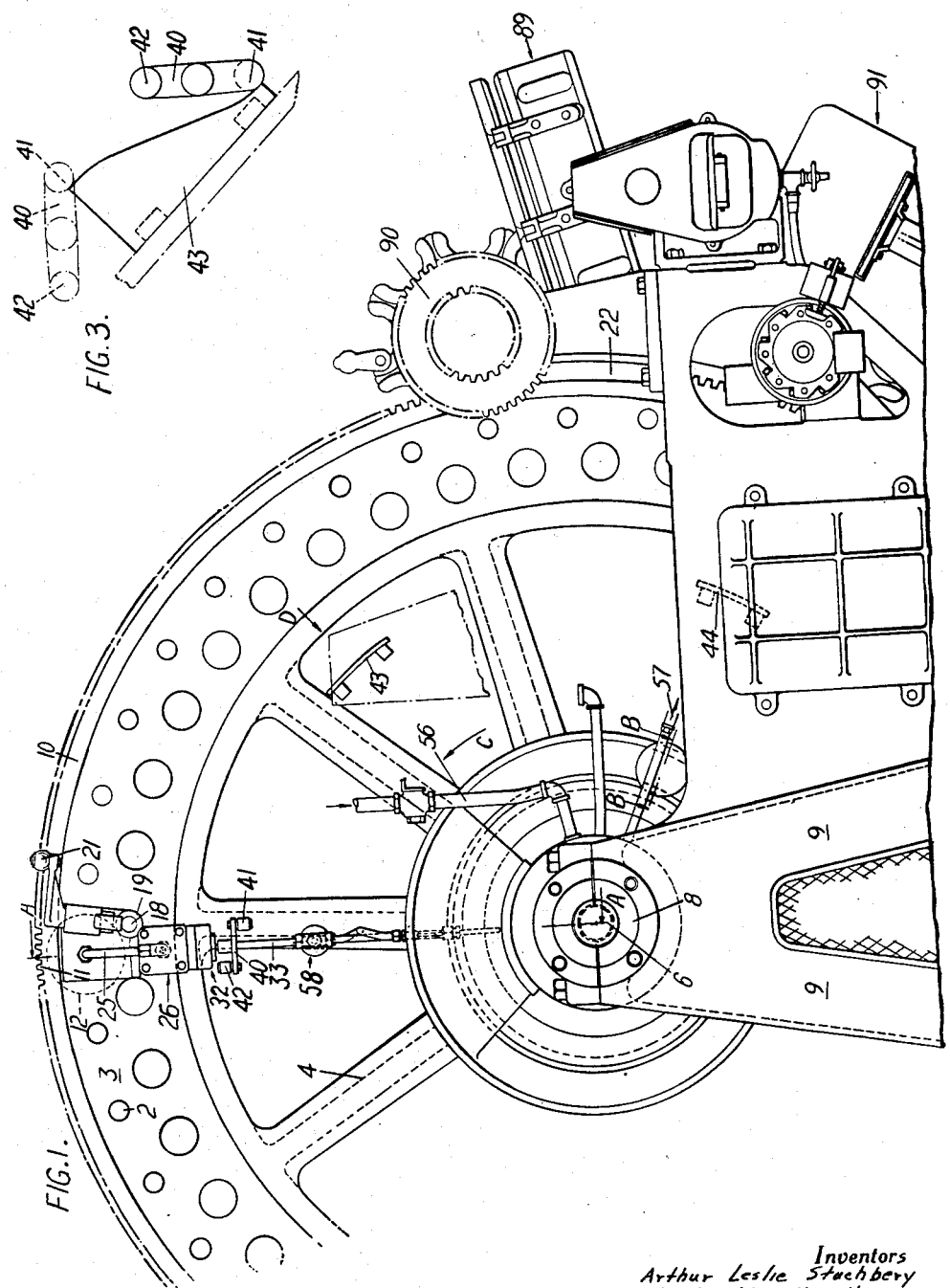

April 20, 1965    A. L. STUCHBERY ETAL    3,178,932
CAN TESTING MACHINES
Filed July 20, 1959      4 Sheets-Sheet 2
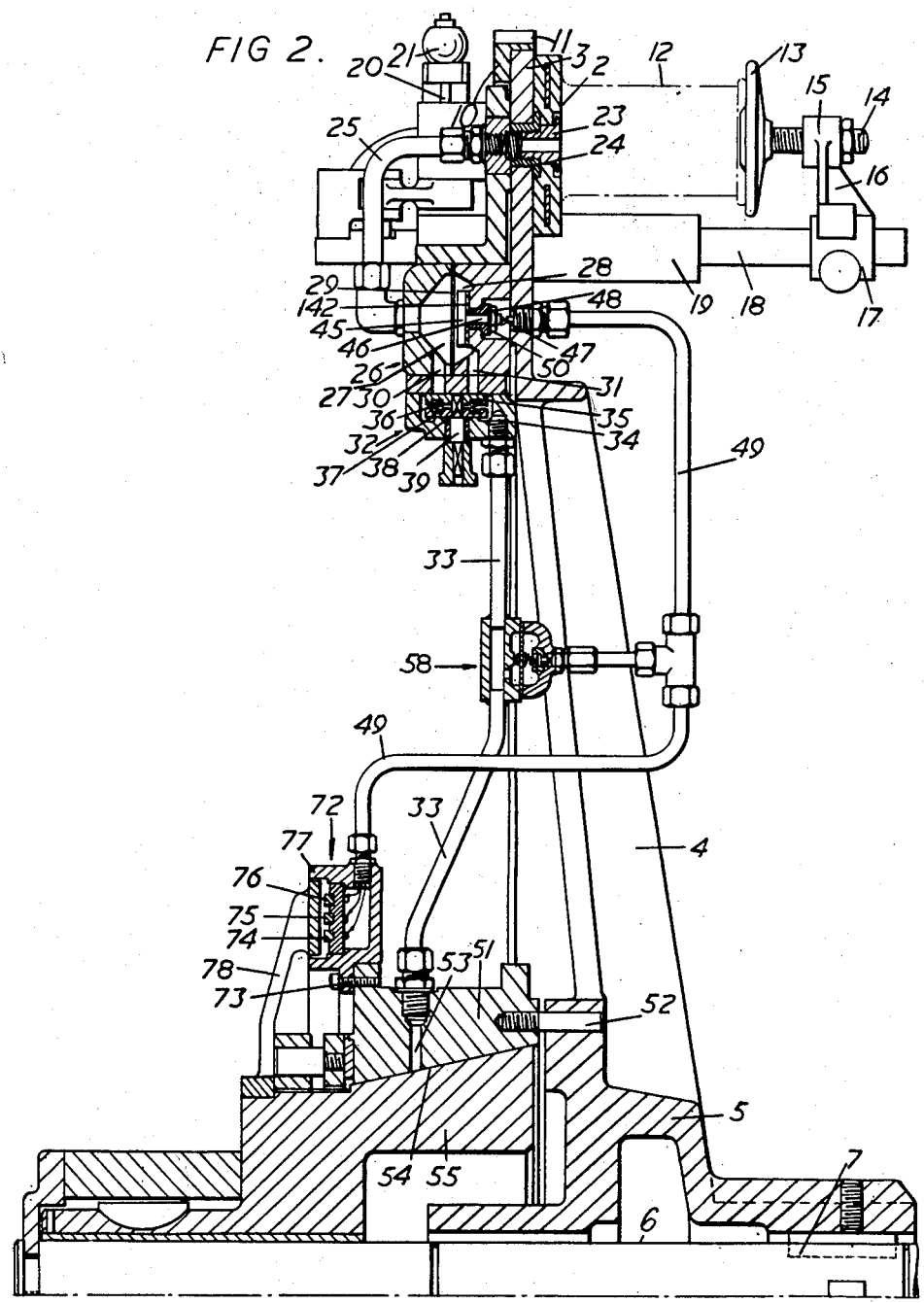

April 20, 1965  A. L. STUCHBERY ETAL  3,178,932
CAN TESTING MACHINES
Filed July 20, 1959  4 Sheets-Sheet 3

Inventors
Arthur Leslie Stuchbery
Stanley Llewellyn Harris
John Alfred Drake
By
Mason, Porter, Diller & Stewart
Attorneys

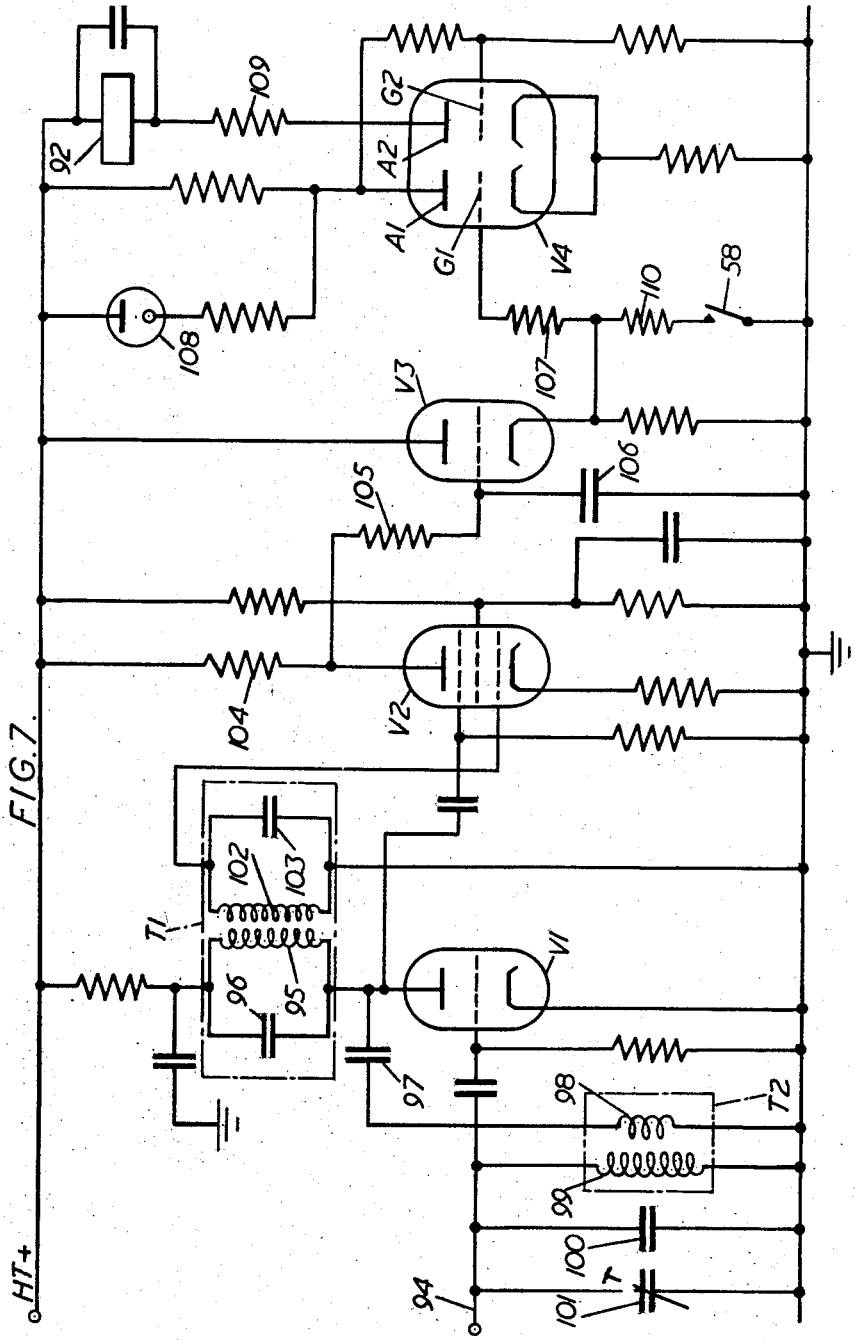

3,178,932
CAN TESTING MACHINES
Arthur Leslie Stuchbery, Enfield, and Stanley Llewellyn Harris, High Wycombe, England, and John Alfred Drake, North Adelaide, South Australia, Australia, assignors to The Metal Box Company Limited, London, England, a British company
Filed July 20, 1959, Ser. No. 828,295
5 Claims. (Cl. 73—45.2)

This invention relates to can testing machines, for testing cans for leaks.

It has been known to clamp cans to be tested on to supports in the rim of a rotatable wheel, to admit air under pressure to the cans, and to detect a drop in pressure in each can due to a leak during rotation of the wheel. In order to sense smaller leaks with this known testing machine it has been necessary to rotate the wheel slowly so that a small leak produces a detectable pressure drop in the can during one revolution of the wheel.

It is a main object of the invention to provide a machine for detecting the presence of leaks in cans in which a high order of sensitivity of detection is achieved at a faster rate of operation than has hitherto been possible.

According to the invention there is provided a machine for testing cans for leaks, comprising an apertured support arranged to move cans in a predetermined path during testing thereof, means cooperating with the support to retain the open end of a can in gas-tight engagement with said support over an aperture therein, a gas line for each said aperture to connect the aperture to a source of gaseous pressure, said line including valve means to control the application of compressed gas to a can, electrical pressure sensitive transducing means connected to the gas line and operable by a fall in pressure due to the presence of a leak in a can, and an electrically activated means connected to said transducing means and operable thereby to give an indication of the presence of the leak.

Further according to the invention, a machine for testing cans for leaks comprises an apertured support arranged to move cans in a predetermined path during testing thereof, and for each aperture in the support means co-operating with the support to retain the open end of a can in air-tight engagement with said support over the aperture, a transducer for each said aperture pneumatically connected to the aperture appropriate thereto and operable to indicate changes in pressure by changes in an electrical parameter, an isolating valve and a supply valve connected to the transducer and arranged for connection to a source of compressed gas to control the application of compressed gas to the can, a coarse leak detector connected between the isolating and supply valves, and electrically actuated means connected to the transducer and operable thereby to given an indication of the presence of a leak in the can when compressed gas is isolated in the can and transducer by the isolating valve.

Figure 5:
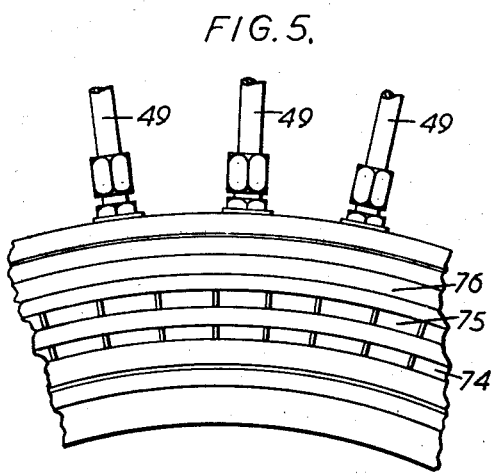
Figure 6:
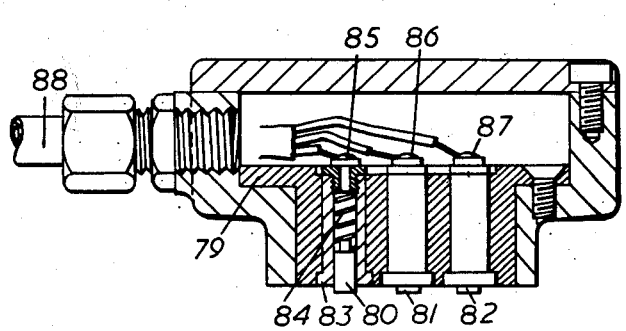

In order that the invention may be clearly understood, one embodiment thereof will now be described, by way of example, with reference to the accompanying drawings, in which:

FIGURE 1 is a front elevation of a part of a machine for testing cans for leaks according to the invention, FIGURE 2 is a section on line A—A of FIGURE 1, FIGURE 3 is an enlarged fragmentary view in the direction of arrow D in FIGURE 1, FIGURE 4 is an enlarged view of a coarse leak indicator shown in FIGURE 2, FIGURE 5 is an elevation of a part of a rotary electrical commutator, FIGURE 6 is a section on line B—B of FIGURE 1, and FIGURE 7 is a circuit diagram of electrically actuated means operable to give an indication of the presence of a leak in a can.

Referring to FIGURES 1 and 2 of the drawings, a machine for testing cans for leaks comprises a circular, apertured support 1 having apertures 2 therein. The support 1 is fixed to the rim 3, FIGURE 2, of a wheel which has a number of spokes 4 which are integral with a central hub 5, FIGURE 2. The hub 5 is keyed to a shaft 6 by a key 7, and the shaft 6 is mounted in bearings 8 which are supported by legs 9, FIGURE 1.

Fixed to the outer periphery of the rim 3 is a ring 10 having outwardly extending teeth 11 which mesh with a driving gear, not shown, to rotate the wheel counter-clockwise as indicated by arrow C in FIGURE 1.

The support 1 is formed from a deformable material such as rubber, and means are provided to co-operate with the support 1 to retain the open end of a can 12, FIGURE 2, in gas-tight engagement with the support 1 over each aperture 2 therein. The means for retaining the open end of a cam 12 in gas-tight engagement with the support 1 comprises for each aperture 2 in the support 1, a pressure plate 13, FIGURE 2, mounted on a rod 14 which is fixed in a collar 15 on a bracket 16. The bracket 16 is mounted on a collar 17 the position of which on one end of shaft 18 is adjustable. The shaft 18 is slidably fitted into a sleeve 19 which passes through the rim 3 of the wheel. To the other end of the shaft 18 is fixed a toggle which is connected to a lever 20, and a cam follower 21 is rotatably mounted on the free end of the lever 20.

The cam follower 21 co-operates with cam surfaces 22, FIGURE 1, on the machine to move the pressure plate 13 towards and away from the rim 3 of the wheel, respectively to clamp the open end of a can on to the support 1 and to release the can from the support.

In each aperture 2 there is fitted a bush 23, FIGURE 2, which fits into an inner sleeve 24 extending through a hole in the rim 3 of the wheel. One end of a gas line 25 is connected to the sleeve 24, and the other end of the gas line 25 is connected to electrical pressure sensitive transducing means 26, hereinafter referred to as a transducer, which consists of a first chamber 27 and a second chamber 28 separated by a spring steel diaphragm 29. The chambers 27 and 28 are respectively connected through ports 30 and 31 to an isolating valve 32 which is a shutter type valve and is operable when closed to isolate the chambers 27 and 28 from each other and from a gas line 33 which is connected to the valve 32 through a port 34.

The isolating valve 32 consists of a shutter 35 which is urged against the openings of the ports 30 and 31, when the valve is in its closed position, as shown in FIGURE 2, by springs 36 mounted between the shutter 35 and a plate 37. The shutter 35 and plate 37 are mounted on a square-sectioned pin 38 which is integral with a rotatable rod 39 which passes through the wall of the valve, and on which is mounted a valve operating lever 40, FIGURE 1. Two cam followers 41 and 42 are respectively mounted on the ends of the lever 40, and the cam followers 41 and 42 co-operate respectively with cam surfaces 43 and 44 which are fixed to the frame of the machine. The shape of the cam surface 43 is shown in FIGURE 3.

When the lever 40 is vertical as shown in FIGURE 3, the isolating valve 32 is open and the cam follower 41 is moved by the cam surface 43, as the wheel rotates, to rotate the lever 40 anti-clockwise to the horizontal position as shown in chain lines in FIGURE 3, in which the isolating valve 32 is closed, and the chambers 27 and 28 are isolated from each other and from the gas line 33.

Similarly, the cam follower 42 co-operates with the cam surface 44 to rotate the lever 40 back to its vertical position as shown in FIGURE 3, in which the isolating valve 32 is open, the chambers 27 and 28 are in communication with each other and with the gas line 33.

Mounted in the second chamber 28 of the transducer is a flat electrode 45, FIG. 2, supported by a rod 46 of electrically conductive material which terminates in a terminal point 47. The rod 46 passes through a bush 48 of insulating material. A steel spring 142 is disposed between the electrode 45 and the casing of the transducer and is electrically insulated therefrom. This spring provides a resilient electrically insulated mounting for the electrode 45. A gas-tight seal is formed around the rod 46 by means of a rubber sealing ring, not shown, located in a groove. A parallel plate condenser is formed by the diaphragm 29 and the flat electrode 45, and a terminal 47 is connected to the central core of a co-axial cable which passes through a grounded conduit 49.

The sensitivity of the transducer, with regard to the change in capacitance produced by a given change in pressure, depends on the distance between the diaphragm 29 and the face of the electrode 45.

This distance can be adjusted by means of an adjusting nut 50, FIG. 2, which is threaded on to the end of the electrode shank 46, and when the adjustment for the required sensitivity has been achieved, the transducer is sealed.

The arrangement of the transducer 26 and the isolating valve 32 described above is provided for each aperture 2 in the support. The gas line 33 for each aperture extends radially of the wheel and is connected to a rotary gas supply means movable with the wheel.

The rotatable part of the rotary supply valve is a ring 51 which is fixed to the wheel by headless bolts 52 one of which is shown in FIGURE 2. Each of the gas lines 33 is connected to a port 53 appropriate thereto in the ring, and the ports 53 open on to the inner face 54 thereof which is inclined relative to the shaft 6. A co-operating external inclined face on a fixed annular member 55 has an inlet port and an exhaust port, both not shown, which are respectively connected to inlet and exhaust lines 56 and 57, FIGURE 1. As the wheel rotates, in direction of arrow C, FIGURE 1, the gas lines 33 are successively connected through the ports 53 to the inlet port of each transducer. Compressed gas is admitted successively to each transducer and can in timed relation with the rotation of the wheel.

When each can has been tested its isolating valve 32 is opened by the action of the isolating valve cam 44 and the compressed gas in the can is exhausted when the can is unloaded from the support 1.

A coarse leak detector for each aperture, shown as a pressure sensitive electrical switch 58, is connected to each transducer and to the gas line 33 appropriate thereto. The coarse leak detector 58 is shown in detail in FIGURE 4, and consists of a gas-tight casing 59 into which the gas line 33 is sealed. The gas line 33 is divided into two parts, and the casing 59 is divided into three chambers, namely a chamber 60 into which the ends of the gas line 33 are sealed, a chamber 61 communicating with the chamber 60 through a port 62 and having a central contact boss 63 on the wall which separates the chamber 61 from the chamber 60, and a chamber 64 separated from the chamber 61 by a diaphragm 65 of electrically insulating material. The chamber 64 is maintained at atmospheric pressure. A contact bolt 66 is held in a central hole in the diaphragm 65 by a nut 67, and washers 68 ensure a gas-tight seal around the bolt 66. The washers 68 are electrically conductive and electrical connection is made with the bolt through a spring 69 to a terminal 70 which is insulated by a bush 71 from the casing 59 of the coarse leak detector. A wire connected to the terminal 70 passes through the grounded conduit 49 which is connected to the casing 59. The force exerted by the spring 69 on the diaphragm 65 is such that when the chambers 64 and 61 are both at atmospheric pressure the nut 67 contacts the boss 63 and connection is made to ground from the terminal 70 and when compressed gas is present in the chamber 61, the diaphragm is moved against the action of the spring 69 and the contact of the nut 67 with the boss 63 is broken.

Wires from the transducers and coarse leak detectors are connected to an electrical rotary commutator 72, FIGURE 2, which is fixed to the ring 51 by bolts 73 so that it is co-axial with the wheel. An elevation of a part of the commutator is shown in FIGURE 5, in which there are seen two tracks of electrically conductive segments 74 and 75, and a track 76 which provides a connection to ground. The segments 74 and 75 and the track 76 are made for example of rhodium plated copper. Each of the segments 74 is connected to the central core of a coaxial cable which is connected to the terminal 47 of the transducer for one of the apertures, and the segment 75 which lies on the same radius of the commutator as that segment 74 is connected to the wire from the coarse leak detector 58 appropriate to that aperture. The track 76 is connected to the housing 77 of the commutator.

On a bracket 78 which is fixed to the fixed member 55 is carried a support 79, FIGURE 6, for three stationary electrical brushes made from any suitable material, for example gold alloy, and each brush contacts one of the tracks of the commutator. The brushes are shown in detail in FIGURE 6 and consist of brush members 80, 81 and 82 housed in insulating brushes 83 in the support 79. The brush members 80, 81, 82 are urged by springs 84 into contact with the commutator tracks 74, 75, 76 and electrical connection is made from the brush members through the springs 84 to terminals 85, 86, 87. Electrical connections from the terminals 85 and 86 are carried in a conduit 88 to electrically actuated means operable to give an indication of the presence of a leak in a can, which is described in detail below with reference to FIGURE 7. The terminal 87 is connected to ground.

The wheel rotates in the direction of arrow C, FIG. 1, and can feeding means of known kind, including a can feeding chute 89 and a star wheel 90 is provided to feed a can into position over each aperture 2 of the wheel as it passes the end of the can feeding chute 89. The open end of each can is maintained in gas-tight engagement with the deformable support 1 by the appropriate pressure plate 13.

Consider the testing of one can 12 loaded over an aperture 2 in the wheel, and immediately, the cooperation of the cam follower 21 for that aperture with the cam surface 22 causes the pressure plate 13 to move towards the support 1 to hold the can 12 in gas-tight engagement with the support 1. After the wheel has rotated through a predetermined angle, the port 53 for the gas line 33 for the aperture 2 over which the can 12 is located, lies over the inlet port connected to the inlet line 56 and compressed gas is admitted to the line 33. The isolating valve 32 is open at this time and compressed gas is also admitted to the chambers 27 and 28 of the transducer 26 and through the gas line 25 to the can 12. When the port 53 has passed over the inlet port, the gas lines and apparatus connected to the aperture 2 are sealed off containing gas under pressure.

If there is no coarse leak in the can which allows this pressure to decay rapidly, the diaphragm 65, FIGURES 2 and 4, of the coarse leak detector 58 will be moved against the action of the spring 69 so that the contact between the boss 63 and the nut 67 will be broken. If however, there is a coarse leak in the can caused for example by a bad seam, or by the can having no end, at the end thereof remote from the aperture 2 the pressure in the line 33 will fall immediately the supply valve being closed, and the nut 67 will contact the boss 63 so that the terminal 70 is grounded.

After rotation of the wheel through another predetermined angle the cam follower 41, FIGURES 1 and 3, engages with the fixed cam surface 43, and the isolating valve 32 is closed by movement of the cam follower along the surface. In the period intervening between the closing of the supply valve and the closing of the isolating valve the pressure in the chambers 27 and 28 of the transducer 26 will have equalised and when the isolating valve has just closed the pressure in the chamber 28 will be equal to that in the can 12. The wheel continues to rotate, and if there is a leak in the can the pressure in the chamber 27 will fall as the wheel rotates, and the diaphragm 29 will be displaced thus varying the capacitance between the diaphragm 29 and the flat electrode 45. By the time the wheel reaches the position in which the segments 74 and 75 of the commutator, which are connected respectively to the terminal 70 of the pressure sensitive switch and the terminal 47 of the transducer appropriated to the aperture 2 over which the can 12 is located, are wiped by the brushes 80 and 81 there will have been a measurable change in the electrical capacitance of the transducer. If a leak is present in the can, as soon as connection is made by the brushes 80 and 81 to the appropriate segments, the electrically actuated means will operate as described below to indicate that the can is to be rejected.

Rotation of the wheel continues, the isolating valve 32 is opened by co-operation of the cam follower 42 with the cam surface 44, and the can is unloaded by a can unloading device 91, FIGURE 1, of known kind, which includes a can rejecting gate, not shown.

If the can does not have a leak, the coarse leak detector 58 remains open and there is no fall in pressure due to leakage to displace the diaphragm 29 of the transducer 26 during rotation of the wheel so that the can would be unloaded by the device 91 at a delivery station for non-leaking cans.

When the compressed gas enters the can through the supply valve and isolating valve at the beginning of the testing thereof, work is done by the compressed gas in compressing the gas already in the can, gas lines, and transducer, and heat is generated. The work done in compressing the gas in the can 12, gas line 25 and chamber 27 will be greater than that done in compressing the gas in chamber 28, so that more heat will be generated in the can 12 and chamber 27 than in chamber 28. Further, the thermal capacity of the apparatus communicating with one side of the diaphragm 29 will be different from that communicating with the other side, and the surface area for cooling of the can 12, and pipe line 25, is much greater than that for cooling of the chamber 28. Thus, although the pressure in chambers 27 and 28 will be equal just after the isolating valve 32 is shut, temperature differences will thereafter tend to cause a difference in pressure between the chambers 27 and 28 even though there is no leak in the can. To prevent these differences from causing the rejection of a sound can, they are compensated for in the construction of electrically actuated means which is connected to the transducer 26 through the commutator 72.

The electrically actuated means is illustrated in FIGURE 7 of the drawings, and includes an electromagnetic relay 92 which operates the can rejecting gate.

One end of the relay 92 is connected to a source of H.T. voltage, and the other end is connected through a circuit including vacuum tubes V1, V2, V3 and V4, FIGURE 7, to a line 94 which is connected to the brush 80 and accordingly to each of the transducers 26 successively.

The tube V1 forms with its associated circuitry a tuned anode/tuned grid oscillator. Connected to the anode of the tube V1 is the primary winding 95 of a transformer T1. A capacitor 96 is connected in parallel with the winding 95 to form a resonant circuit. The anode of tube V1 is also connected through a capacitor 97 to one end of a winding 98 of a coupling transformer T2. The other winding 99 of the coupling transformer T2 is connected through a CR coupling circuit to the control grid of the tube V1, and connected in parallel with the winding 99 are a fixed capacitor 100, and a variable capacitor 101. The parallel plate capacitors formed by the diaphragm 29 and flat electrode 45 of each transducer are also connected successively in parallel with the winding 99 through the commutator as the wheel rotates. The initial effective capacitance in the tuned grid circuit is thus the sum of the capacitance of the transducer parallel plate when the disphragm 29 has not been displaced, with the capacitance of the capacitors 100 and 101. By adjustment of the variable capacitor 101, this grid circuit can be tuned so that it resonates at the same frequency as that of the tuned anode circuit. The variable capacitor 101 is preset to a value which will compensate for differences between the thermal capacity of the first chamber 27 of the transducer 26 and the can 12, and the thermal capacity of the second chamber 28. Owing to this difference in thermal capacities, there will be a movement of the diaphragm 29 to cause a drop in the capacitance of the parallel plate capacitor, and this drop will be compensated for by connecting into the grid circuit of the tube V1 a predetermined amount of capacitance. To this end it is convenient to employ a variable air capacitor with a trimmer capacitor connected in parallel therewith as the variable capacitor 101.

The secondary winding 102 of the transformer T1 is tuned by a capacitor 103 and is connected to the control grid of a pentode tube V2 which with its associated circuitry forms a phase-change frequency modulation detector of known kind. The suppressor grid of the tube V2 is connected through a CR coupling circuit to the anode of the oscillator tube V1 and an anode load resistor 104 of high value is connected to the anode of tube V2. A change in the frequency of the oscillator appears as a fall in the D.C. output voltage at the anode of the tube V2. A filter circuit consisting of a resistor 105 and a capacitor 106 connects the anode of tube V2 to the grid of a cathode follower tube V3, and the output from the cathode follower V3 is connected through a grid resistor 107 to one grid G1 of a double-triode tube V4 which forms with its associated circuitry a Schmidt trigger circuit of known kind.

The triode which includes grid G1 and its associated anode A1 is normally conducting and has a neon indicator lamp 108 connected thereto to indicate the state of the trigger circuit. The other anode A2 of the tube V4 is connected through a resistor 109 to the coil of the relay 92. The cathode of the cathode follower V3 is connected through a resistor 110 to the brush 81, FIGURE 6, of the commutator. Thus the coarse leak detectors 58, shown diagrammatically in FIGURE 7, are connected in turn to the grid G1 as the wheel rotates.

The values of the components forming the trigger circuit are so selected that when the voltage of grid G1 falls below a predetermined value the circuit is triggered and the relay 92 is energised.

The triggering threshold of the Schmidt trigger circuit is so arranged that the circuit is only triggered by a fall in potential which results either from a change in the frequency of the oscillator due to displacement of a diaphragm 29 owing to the presence of a leak in a can, or from the connection of a closed coarse leak detector 58 to the grid G1. Thus spurious changes in the frequency of the oscillator which may occur as the transducers are successively connected to the line 94 are ineffective in triggering the Schmidt trigger circuit. The relay 92 when energised indicates the presence of a leak in a can, and is operable to initiate operation of the can rejecting device when the presence of a leak is indicated.

To permit the testing of cans of different sizes, the variable capacitor 101 is adjustable to a predetermined value for each can size, this being the only adjustment necessary in the circuit when changing from the testing of cans of one size to the testing of cans of another size. It will be understood that when testing small cans, either the rate of testing or the severity of the test can be increased as compared with the rate of testing or severity of the test employed for large cans.

The relative lengths of time for gas inlet and equalizing, testing, and unloading and feeding of a can is approximately 4:10:3, and by the apparatus described above there is provided, for example, a can testing machine for testing cans for leaks of the order of 0.002" to 0.0025" in diameter at a rate of approximately 950 cans per minute.

Compressed air is normally used for the testing of cans, but it will be understood that, if desired, any suitable gas may be used.

The cam followers 41 and 42, FIGURES 1 and 2, for each aperture may be replaced by a single roller mounted on the lever 40. This single roller would co-operate with both the cam surfaces 43 and 44 to open and close the shutter valve 32.

In the foregoing description the supply valve is common to all transducers. If desired, however, connection to the source of gas supply may be through a gland and a hole drilled in the wheel shaft 6 and thus to an annular ring main supplying gas to each transducer, each of which is provided with a cam operated supply valve. With this arrangement the coarse leak detectors are connected to a tapping between the isolating and supply valves for the respective transducers. By this means gas of the supply pressure is continuously maintained up to each of the supply valves.

We claim:
1. A machine for automatically testing cans for leaks and for automatically rejecting cans which contain leaks, comprising a rotatable apertured support arranged to move cans in a predetermined path during testing thereof, separate means cooperating with the support to retain the open end of a can to be tested in gas-tight engagement with said support over each aperture, said apertured support being maintained in contact with a fixed central hub, said hub having a supply of pressurized gas, a gas line associated with each aperture, a supply valve for introducing gas under pressure to said gas lines from the supply of pressurized gas within said hub in timed relationship to the rotation of said apertured support about said central hub, a transducer comprising a first and a second chamber separated by an electrically conductive diaphragm and a flat electrode mounted in one of said chambers so as to form a parallel plate capacitor with the chamber separating diaphragm, a gas isolating valve connected to the transducer, a coarse leak detector connected between the isolating valve and the supply valve, electro-magnetic means for rejecting cans having leaks therein, said coarse leak detector having pressure sensitive means for detecting a leak in a can and for actuating said electro-magnetic means, said isolating valve being disposed in said gas line and isolating said first chamber and said second chamber from said supply valve, and electrically actuated means connected to the transducer and operable thereby to actuate said electro-magnetic means if said can has a leak therein.

2. A machine according to claim 1, wherein said pressure sensitive means is a pressure sensitive electrical switch and is operable following the application of compressed gas to the transducer appropriate thereto but prior to the closing of said transducer isolating valve and subsequent to the closing of the supply valve so as to detect a fall of pressure between the can and the supply valve.

3. A machine according to claim 1, wherein an electrical rotary commutator is fixed to the rotatable support co-axially therewith and includes two tracks of electrically conductive segments and a stationary electrical brush contacting each track, the segments of one track being connected each to a flat electrode of a transducer appropriate thereto, and the segments of the other track being connected each to a coarse leak detector appropriate thereto and comprising a pressure sensitive electrical switch.

4. A machine according to claim 1, wherein the electrically actuated means includes an oscillator controlled by a tuned circuit, and a frequency modulation detector connected to an output from the oscillator, each parallel plate capacitor being connectable to the tuned circuit and operable, when the pressure in the can appropriate thereto falls, to vary the frequency of the output from the oscillator, the variation in frequency being detected by the frequency modulation detector which produces an output indicative of the presence of a leak in the can.

5. A machine according to claim 4, wherein a variable capacitor is connected to the tuned circuit and is operable to compensate for differences between the thermal capacity of the first chamber and can, and the second chamber.

References Cited in the file of this patent
UNITED STATES PATENTS

| | | |
|---|---|---|
| 779,719 | Kruse | Jan. 10, 1905 |
| 1,845,362 | Tevander | Feb. 16, 1932 |
| 1,900,918 | Dieter | Mar. 14, 1933 |
| 1,971,065 | Dieter | Aug. 21, 1934 |
| 2,013,402 | Cameron | Sept. 3, 1935 |
| 2,615,327 | Foust | Oct. 28, 1952 |
| 2,630,705 | Laxo | Mar. 10, 1953 |
| 2,924,965 | Westerheim | Feb. 16, 1960 |
| 2,936,611 | Le Mat et al. | May 17, 1960 |